United States Patent
Ichimoto

(10) Patent No.: US 7,765,964 B2
(45) Date of Patent: Aug. 3, 2010

(54) VARIABLE VALVE OPERATING DEVICE, CONTROL METHOD OF VARIABLE VALVE OPERATING DEVICE, AND VEHICLE EQUIPPED WITH VARIABLE VALVE OPERATING DEVICE

(75) Inventor: Kazuhiro Ichimoto, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 312 days.

(21) Appl. No.: 12/084,825

(22) PCT Filed: Apr. 19, 2007

(86) PCT No.: PCT/JP2007/058543

§ 371 (c)(1),
(2), (4) Date: May 9, 2008

(87) PCT Pub. No.: WO2007/138801

PCT Pub. Date: Dec. 6, 2007

(65) Prior Publication Data

US 2009/0255493 A1    Oct. 15, 2009

(30) Foreign Application Priority Data

May 25, 2006   (JP)   ............................ 2006-145786

(51) Int. Cl.
*F01L 1/34* (2006.01)

(52) U.S. Cl. ............... 123/90.15; 123/90.17; 123/347; 180/65.21; 701/113

(58) Field of Classification Search ............. 123/90.15, 123/90.16, 90.17, 90.18, 347, 348, 90.11; 180/65.21, 65.28, 65.285, 65.29, 65.31; 701/22, 701/113
See application file for complete search history.

(56) References Cited

U.S. PATENT DOCUMENTS 6,965,824 B2 * 11/2005 Ichimoto et al. ............ 701/113

FOREIGN PATENT DOCUMENTS

| JP | 61-169641 | 7/1986 |
|----|-----------|--------|
| JP | 06-213021 | 8/1994 |
| JP | 2000-034913 A | 2/2000 |
| JP | 2003-206777 | 7/2003 |
| JP | 2004-137984 | 5/2004 |
| JP | 2004-320877 | 11/2004 |
| JP | 2005-042660 | 2/2005 |
| WO | WO99/47801 | 9/1999 |

* cited by examiner

Primary Examiner—Ching Chang
(74) Attorney, Agent, or Firm—Kenyon & Kenyon LLP

(57) ABSTRACT

In a hybrid vehicle, on a start of an engine, when an engine water temperature is low and there is a need of advancing open and close timings of an intake valve from their most delayed positions, electric power is supplied to a VVT motor either via a first route or via a second route. Even when the state of charge of a low voltage battery is very low and insufficient, the required electric power is supplied from a DC-DC converter to the VVT motor without passing through the low voltage battery. On the start of the engine, such start control ensures an adequate change of the open and close timings of the intake valve set in the stop state of the engine.

13 Claims, 11 Drawing Sheets

VARIABLE VALVE OPERATING DEVICE, CONTROL METHOD OF VARIABLE VALVE OPERATING DEVICE, AND VEHICLE EQUIPPED WITH VARIABLE VALVE OPERATING DEVICE

This is a 371 national phase application of PCT/JP2007/058543 filed 19 Apr. 2007, claiming priority to Japanese Patent Application No. JP 2006-145786 filed 25 May 2006, the contents of which are incorporated herein by reference.

TECHNICAL FIELD

The present invention relates to a variable valve operating device, a control method of the variable valve operating device, and a vehicle equipped with the variable valve operating device.

BACKGROUND ART

A variable valve operating device is conventionally used to vary open and close timings of an intake valve for an internal combustion engine, on a restart of the internal combustion engine or during operation of the internal combustion engine. One configuration of the variable valve operating device is disclosed in Patent Document 1. In an ordinary state where the temperature of the internal combustion engine is not lowered, this prior art variable valve operating device restarts the internal combustion engine with no variation of the close timing of the intake valve set to its most delayed position at a stop time of the internal combustion engine. In a low temperature state where the temperature of the internal combustion engine is lowered, on the other hand, the prior art variable valve operating device restarts the internal combustion engine with an advance of the close timing of the intake valve from its most delayed position. In the ordinary state, such control lowers the inertia supercharging and decreases the compression ratio in the cylinder, thus restricting the potential vibration on the start of the internal combustion engine. In the low temperature state, such control restricts the decrease in compression ratio in the cylinder, thus ensuring startability of the internal combustion engine.

Patent Document 1: Japanese Patent Laid-Open No. 2000-34913

DISCLOSURE OF THE INVENTION

The open and close timings of the valve are varied, for example, by operating a motor to rotate a camshaft of the valve. The motor is generally operated with electric power from an auxiliary machinery battery. At a low charge level of the auxiliary machinery battery, however, the motor is not operable with the electric power of the auxiliary machinery battery. This leads to failed variation of the open and close timings of the valve.

In a variable valve operating device, a control method of the variable valve operating device, and a vehicle equipped with the variable valve operating device, there would be a demand for, on a start of an internal combustion engine, enabling an adequate variation of open and close timings of a valve set at a stop time of the internal combustion engine.

The present invention accomplishes at least part of the demands mentioned above by the following configurations applied to the variable valve operating device, the control method of the variable valve operating device, and the vehicle equipped with the variable valve operating device.

One aspect of the invention pertains to a first variable valve operating device using a valve-driving motor to vary open and close timings of at least one of an intake valve and an exhaust valve for an internal combustion engine. The variable valve operating device has:

a first route constructed to supply an electric power from a low voltage accumulator to the valve-driving motor, where the low voltage accumulator is capable of storing a low voltage obtained by stepping down a high voltage supplied from a high voltage power source by means of an electric power conversion circuit;

a second route constructed to supply an electric power as the low voltage obtained by stepping down the high voltage by means of the electric power conversion circuit without passing through the low voltage accumulator; and a controller configured to control the valve-driving motor, which receives the supply of electric power via either of the first route or the second route, to vary the open and close timings of the at least one of the intake valve and the exhaust valve on a start of the internal combustion engine, in response to a requirement for varying the open and close timings set at a stop time of the internal combustion engine.

The first variable valve operating device according to one aspect of the invention supplies the electric power via either of the first route or the second route to the valve-driving motor to vary the open and close timings of the at least one of the intake valve and the exhaust valve on a start of the internal combustion engine, in response to a requirement for varying the open and close timings set at a stop time of the internal combustion engine. Even in the event of failed supply of required electric power from the low voltage accumulator to the valve-driving motor, the electric power from the high voltage power source is used to vary the open and close timings of at least one of the intake valve and the exhaust valve. On the start of the internal combustion engine, the first variable valve operating device enables an adequate variation of the open and close timings of the intake valve or the exhaust valve set in the stop state of the internal combustion engine.

The variation of the open and close timings of the valve is required, for example, in the case of the high viscosity of oil used for the internal combustion engine under the condition that the open and close timings of the valve are set to or close to their most delayed positions in the stop state of the internal combustion engine. Starting the internal combustion engine in this condition does not generate a sufficient amount of combustion energy. The open and close timings of the valve are thus advanced to ensure generation of a sufficient amount of combustion energy.

In one preferable embodiment according to this aspect of the invention, the first variable valve operating device further has: a state detector configured to detect a state of charge or a state of discharge of the low voltage accumulator; and a route switchover mechanism configured to activate or deactivate the second route for supplying the electric power to the valve-driving motor. When the state of charge or the state of discharge of the low voltage accumulator detected by the state detector satisfies a predetermined low level, the controller controls the route switchover mechanism to activate the second route for supplying the electric power to the valve-driving motor, while controlling the valve-driving motor, which receives the supply of electric power via either of the first route or the second route, to vary the open and close timings of the at least one of the intake valve and the exhaust valve. At the low state of charge or the low state of discharge of the low voltage accumulator, the low voltage accumulator has difficulty in supplying the electric power required for operating the valve-driving motor. This configuration of the first variable valve operating device is thus especially effective in such cases.

In another preferable embodiment according to this aspect of the invention, the first variable valve operating device further has: a temperature detector configured to measure a temperature of the internal combustion engine; and a route switchover mechanism configured to activate or deactivate the second route for supplying the electric power to the valve-driving motor. When the temperature of the internal combustion engine measured by the temperature detector is within a predetermined low temperature range, the controller controls the route switchover mechanism to activate the second route for supplying the electric power to the valve-driving motor, while controlling the valve-driving motor, which receives the supply of electric power via either of the first route or the second route, to vary the open and close timings of the at least one of the intake valve and the exhaust valve. At the low temperature of the internal combustion engine, the low voltage accumulator tends to have poor performance. This configuration of the first variable valve operating device is thus especially effective in such cases.

Another aspect of the invention pertains to a second variable valve operating device using a valve-driving motor to vary open and close timings of at least one of an intake valve and an exhaust valve for an internal combustion engine. The variable valve operating device has:

a first route constructed to supply an electric power from a low voltage accumulator to the valve-driving motor, where the low voltage accumulator is capable of storing a low voltage obtained by stepping down a high voltage supplied from a high voltage power source by means of an electric power conversion circuit;

a third route constructed to supply an electric power from an external power source, which is different from the high voltage power source, to the valve-driving motor without passing through the low voltage accumulator; and a controller configured to control the valve-driving motor, which receives the supply of electric power via either of the first route or the third route, to vary the open and close timings of the at least one of the intake valve and the exhaust valve on a start of the internal combustion engine, in response to a requirement for varying the open and close timings set at a stop time of the internal combustion engine.

The second variable valve operating device according to another aspect of the invention supplies the electric power via either of the first route or the third route to the valve-driving motor to vary the open and close timings of the at least one of the intake valve and the exhaust valve on a start of the internal combustion engine, in response to a requirement for varying the open and close timings set at a stop time of the internal combustion engine. Even in the event of failed supply of required electric power from the low voltage accumulator to the valve-driving motor, the electric power from the external power source is used to vary the open and close timings of at least one of the intake valve and the exhaust valve. On the start of the internal combustion engine, the second variable valve operating device enables an adequate variation of the open and close timings of the intake valve or the exhaust valve set in the stop state of the internal combustion engine.

In one preferable embodiment according to this aspect of the invention, the second variable valve operating device further has: a state detector configured to detect a state of charge or a state of discharge of the low voltage accumulator; and a route switchover mechanism configured to activate or deactivate the third route for supplying the electric power to the valve-driving motor. When the state of charge or the state of discharge of the low voltage accumulator detected by the state detector satisfies a predetermined low level, the controller controls the route switchover mechanism to activate the third route for supplying the electric power to the valve-driving motor, while controlling the valve-driving motor, which receives the supply of electric power via either of the first route or the third route, to vary the open and close timings of the at least one of the intake valve and the exhaust valve. At the low state of charge or the low state of discharge of the low voltage accumulator, the low voltage accumulator has difficulty in supplying the electric power required for operating the valve-driving motor. This configuration of the second variable valve operating device is thus especially effective in such cases.

In another preferable embodiment according to this aspect of the invention, the second variable valve operating device further has: a temperature detector configured to measure a temperature of the internal combustion engine; and a route switchover mechanism configured to activate or deactivate the third route for supplying the electric power to the valve-driving motor. When the temperature of the internal combustion engine measured by the temperature detector is within a predetermined low temperature range, the controller controls the route switchover mechanism to activate the third route for supplying the electric power to the valve-driving motor, while controlling the valve-driving motor, which receives the supply of electric power via either of the first route or the third route, to vary the open and close timings of the at least one of the intake valve and the exhaust valve. At the low temperature of the internal combustion engine, the low voltage accumulator tends to have poor performance. This configuration of the second variable valve operating device is thus especially effective in such cases.

In the second variable valve operating device according to the invention, the external power source may be a home power source. This ensures supply of a constant voltage.

In one preferable application according to the invention, the first variable valve operating device or the second variable valve operating device further has:

a reference pulley fixed to a camshaft with a cam for opening and closing the intake valve or the exhaust valve to keep a predetermined positional relation to the camshaft and configured to rotate with rotation of the internal combustion engine, wherein the valve-driving motor changes the positional relation of the reference pulley to the camshaft.

According to still another aspect, the invention is directed to a vehicle equipped with the variable valve operating device having any of the above configurations. The vehicle according to the invention accordingly has the same advantages as those of the variable valve operating device explained above. For example, on the start of the internal combustion engine, the vehicle enables an adequate variation of the open and close timings of the intake valve or the exhaust valve set in the stop state of the internal combustion engine.

Another aspect of the invention is directed to a first control method of a variable valve operating device, which uses a valve-driving motor to vary open and close timings of at least one of an intake valve and an exhaust valve for an internal combustion engine. The control method controls the valve-driving motor, which receives a supply of electric power via either of a first route or a second route, to vary the open and close timings of the at least one of the intake valve and the exhaust valve on a start of the internal combustion engine, in response to a requirement for varying the open and close timings set at a stop time of the internal combustion engine, where the first route supplies an electric power to the valve-driving motor from a low voltage accumulator that is capable of storing a low voltage obtained by stepping down a high voltage supplied from a high voltage power source by means of an electric power conversion circuit, and the second route supplies an electric power as the low voltage obtained by stepping down the high voltage by means of the electric power conversion circuit without passing through the low voltage accumulator.

The first control method of the variable valve operating device according to this aspect of the invention supplies the electric power via either of the first route or the second route to the valve-driving motor to vary the open and close timings of the at least one of the intake valve and the exhaust valve on a start of the internal combustion engine, in response to a requirement for varying the open and close timings set at a stop time of the internal combustion engine. Even in the event of failed supply of required electric power from the low voltage accumulator to the valve-driving motor, the electric power from the high voltage power source is used to vary the open and close timings of at least one of the intake valve and the exhaust valve. On the start of the internal combustion engine, the first control method of the variable valve operating device enables an adequate variation of the open and close timings of the intake valve or the exhaust valve set in the stop state of the internal combustion engine. The first control method of the variable valve operating device may have any additional steps corresponding to the additional functions and actions of the first variable valve operating device described above.

Still another aspect of the invention is directed to a second control method of a variable valve operating device, which uses a valve-driving motor to vary open and close timings of at least one of an intake valve and an exhaust valve for an internal combustion engine. The control method controls the valve-driving motor, which receives a supply of electric power via either of a first route or a third route, to vary the open and close timings of the at least one of the intake valve and the exhaust valve on a start of the internal combustion engine, in response to a requirement for varying the open and close timings set at a stop time of the internal combustion engine, where the first route supplies an electric power to the valve-driving motor from a low voltage accumulator that is capable of storing a low voltage obtained by stepping down a high voltage supplied from a high voltage power source by means of an electric power conversion circuit, and the third route supplies an electric power from an external power source, which is different from the high voltage power source, to the valve-driving motor without passing through the low voltage accumulator.

The second control method of the variable valve operating device according to this aspect of the invention supplies the electric power via either of the first route or the third route to the valve-driving motor to vary the open and close timings of the at least one of the intake valve and the exhaust valve on a start of the internal combustion engine, in response to a requirement for varying the open and close timings set at a stop time of the internal combustion engine. Even in the event of failed supply of required electric power from the low voltage accumulator to the valve-driving motor, the electric power from the external power source is used to vary the open and close timings of at least one of the intake valve and the exhaust valve. On the start of the internal combustion engine, the second control method of the variable valve operating device enables an adequate variation of the open and close timings of the intake valve or the exhaust valve set in the stop state of the internal combustion engine. The second control method of the variable valve operating device may have any additional steps corresponding to the additional functions and actions of the second variable valve operating device described above.

BEST MODES OF CARRYING OUT THE INVENTION

One mode of carrying out the invention is discussed below as a preferred embodiment with reference to the accompanied drawings.

Examples

Figure 1:
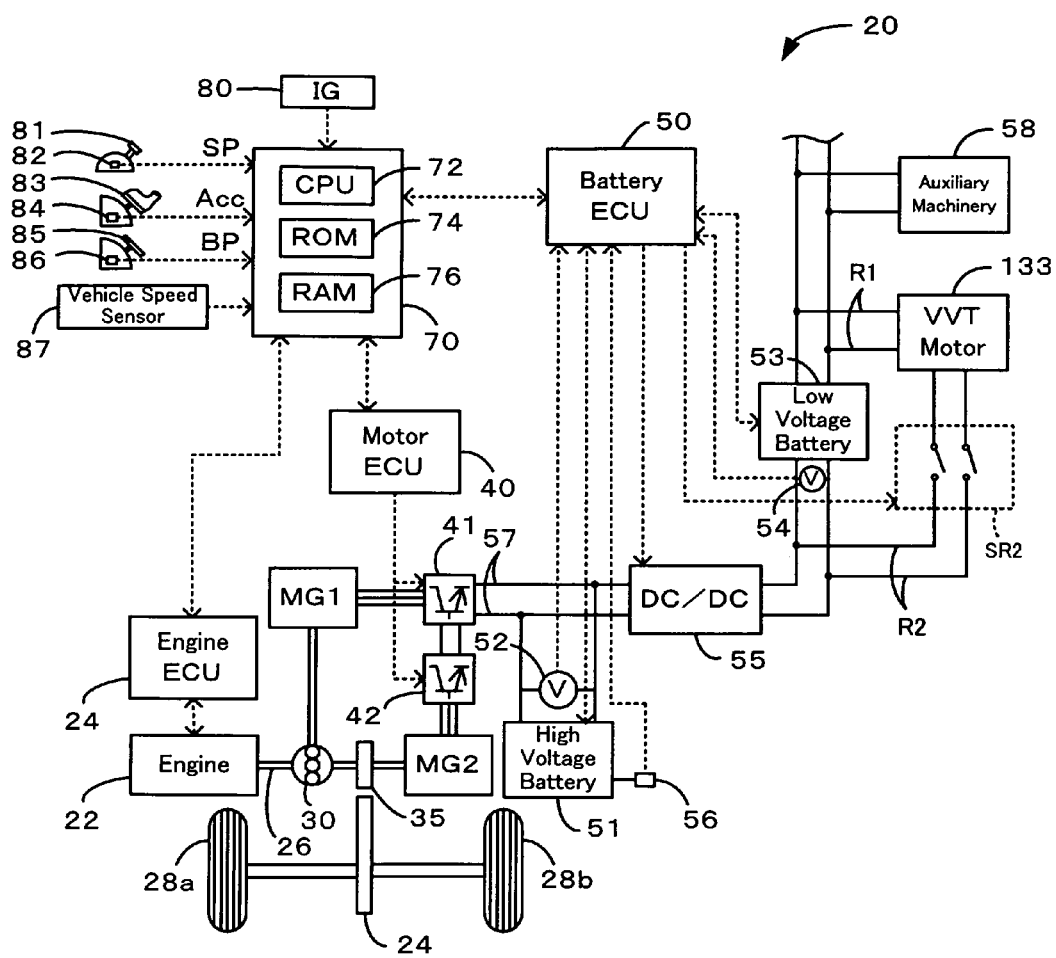
FIG. 1 schematically illustrates the configuration of a hybrid vehicle 20 according to one embodiment of the invention.

FIG. 1 schematically illustrates the configuration of a hybrid vehicle 20 according to one embodiment of the invention. As illustrated, the hybrid vehicle 20 of the embodiment includes an engine 22, a planetary gear mechanism 30 having a carrier connected via a damper to a crankshaft 26 or an output shaft of the engine 22, a motor MG1 being linked with a sun gear of the planetary gear mechanism 30 and having power generation capability, a motor MG2 being linked via a reduction gear 35 with a ring gear shaft or a driveshaft connected with the planetary gear mechanism 30, a high voltage battery 51 allowing transmission of electrical energy to and from the motor MG1 and the motor MG2, a low voltage battery 53 allowing input of electrical energy from the high voltage battery 51, and a hybrid electronic control unit 70 controlling the operations of the whole hybrid vehicle 20.

Figure 2:
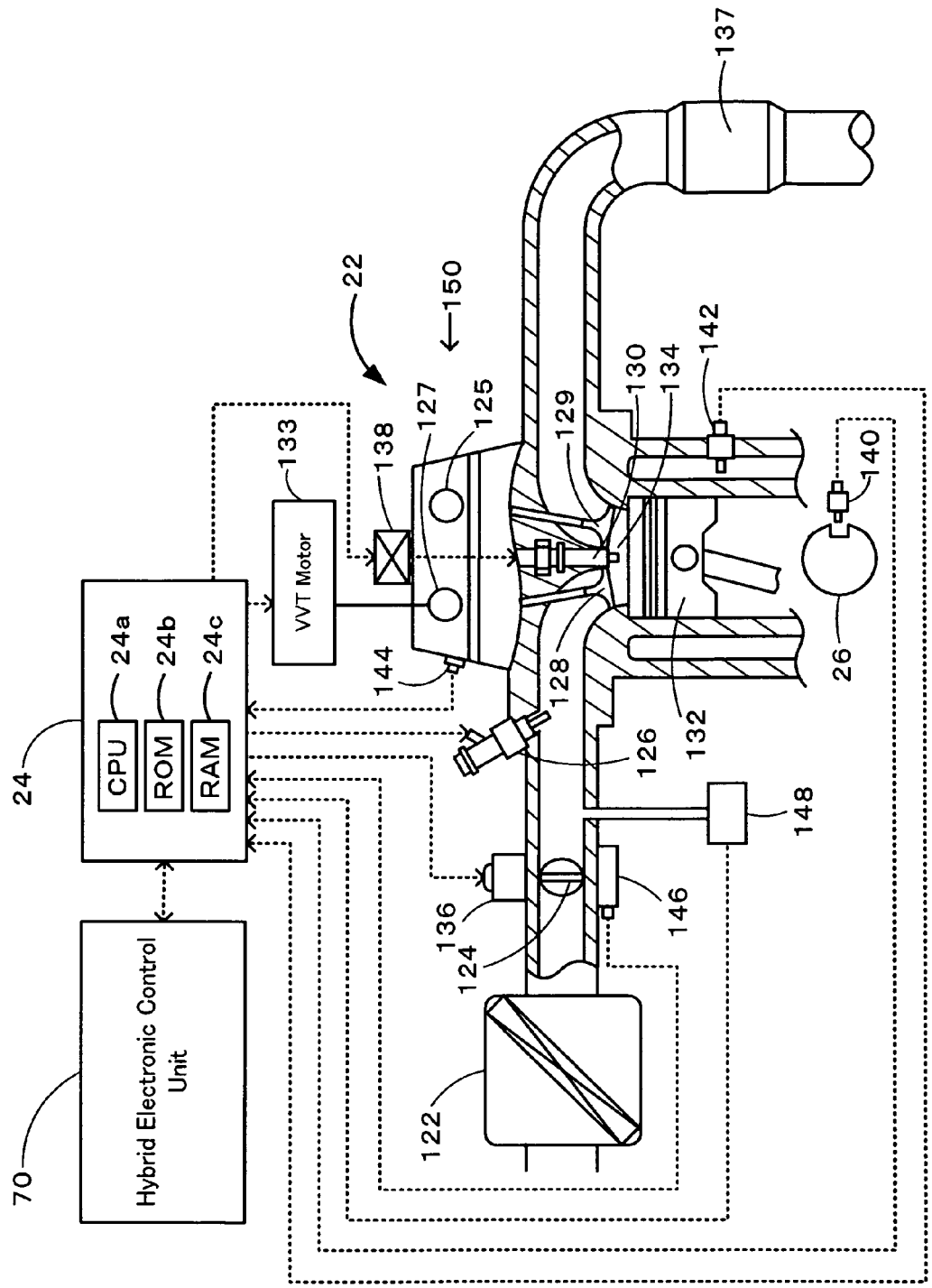
FIG. 2 shows the schematic structure of an engine 22.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized fuel injected from a fuel injection valve 126 to the air-fuel mixture. The air-fuel mixture is introduced into a combustion chamber 134 by means of an intake valve 128. The introduced air-fuel mixture is ignited with spark made by a spark plug 130 to be explosively combusted. The reciprocating motions of a piston 132 pressed down by the combustion energy are converted into rotational motions of the crankshaft 26. The open and close timings of the intake valve 128 are varied and adjusted by a variable valve timing mechanism 150. The exhaust from the engine 22 goes through a catalytic converter (three-way catalyst) 137 to convert toxic components included in the exhaust, that is, carbon monoxide (CO), hydrocarbons (HC), and nitrogen oxides (NOx), into harmless components, and is discharged via an exhaust valve 129 to the outside air.

Figure 3:
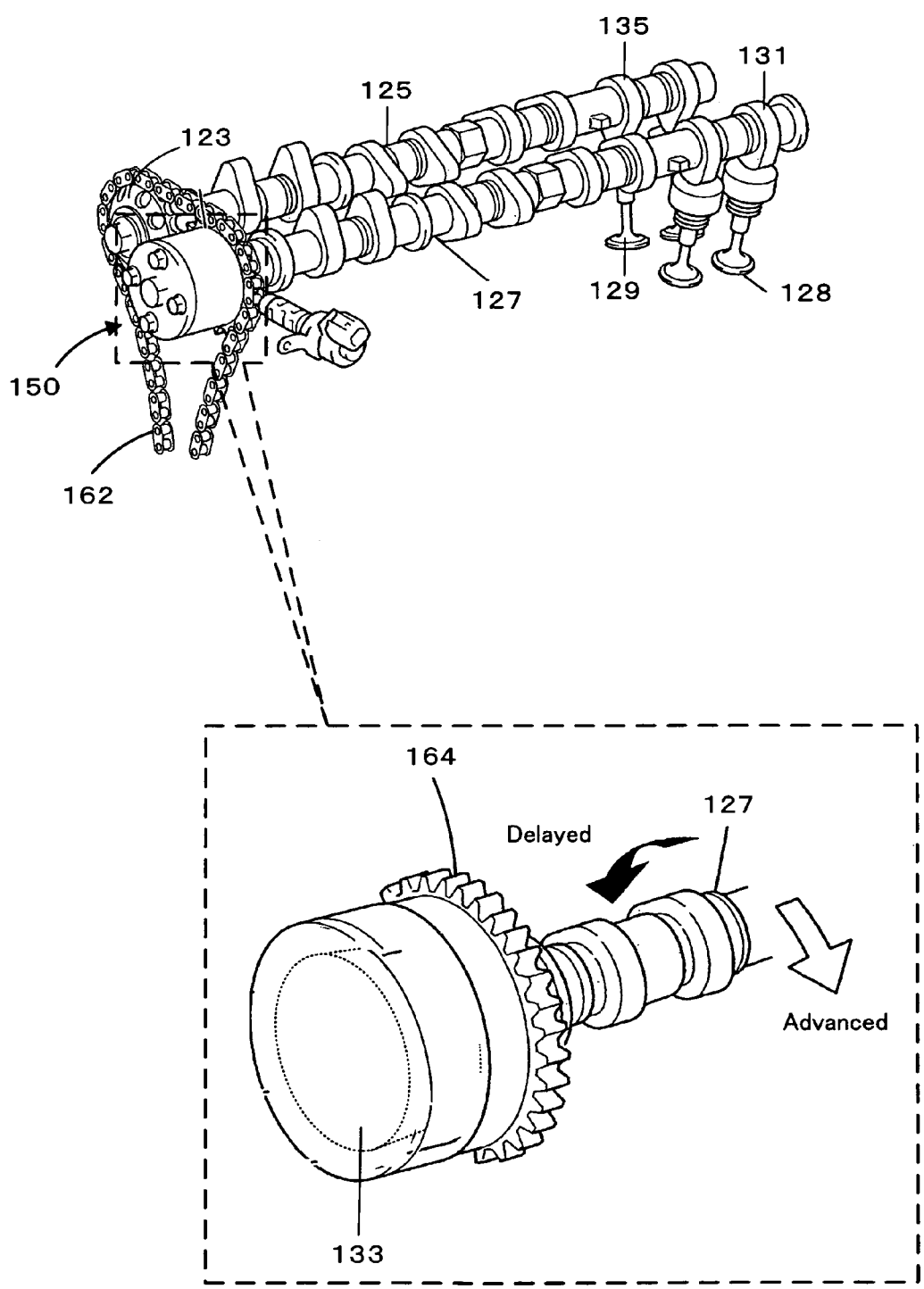
FIG. 3 shows the schematic structure of a variable valve timing mechanism 150.

A crank pulley (not shown) is attached to one end of the crankshaft 26 to be rotated integrally with the crank shaft 26. The crank pulley is connected via a timing chain 162 with an intake cam shaft pulley 164 attached to one end of an intake cam shaft 127 and with an exhaust cam shaft pulley 123 attached to one end of an exhaust cam shaft 125, as shown in FIG. 3. The timing chain 162 is set on a sprocket (not shown) provided on the crank pulley. With rotation of the crank pulley led by rotation of the crankshaft 26, the intake cam shaft pulley 164 and the exhaust cam shaft pulley 123 rotate to respectively open and close the intake valve 128 and the exhaust valve 129 by means of a corresponding one of intake cams 131 arrayed on the intake cam shaft 127 and a corresponding one of exhaust cams 135 arrayed on the exhaust cam shaft 125.

Figure 4:
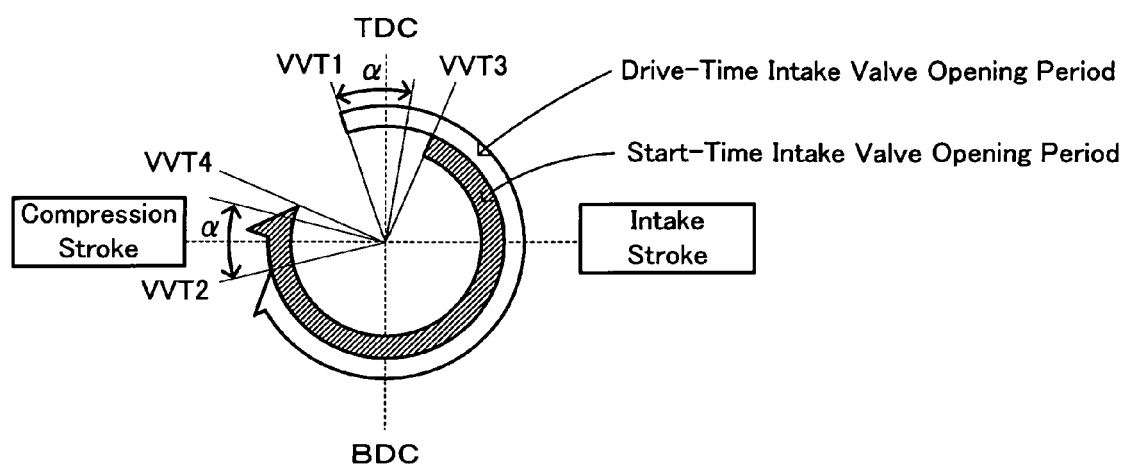
FIG. 4 is a valve timing diagram showing open and close timings of an intake valve 128.

As illustrated in FIGS. 2 and 3, the variable valve timing mechanism 150 has a direct current VVT motor 133 that is attached to one end of the intake cam shaft 127 to shift the intake cam shaft 127 in an advanced direction or in a delayed direction. The operation of the VVT motor 133 continuously changes the phase of the intake cam shaft 127 relative to the intake cam shaft pulley 164 and thereby varies the open and close timings of the intake valve 128. The details of the variable valve timing mechanism 150 are disclosed in, for example, Japanese Patent Laid-Open No. 2004-3419. FIG. 4 is a valve timing diagram showing the open and close timings of the intake valve 128 varied by the variable valve timing mechanism 150. As illustrated, during driving of the hybrid vehicle 20, the intake valve 128 is opened according to the driving state in a range of α degrees from a driving-time advanced valve open position VVT1 slightly before a top dead center (TDC) of an intake stroke. The intake valve 128 is closed according to the driving state in a range of α degrees from a driving-time advanced valve close position VVT2 slightly after a bottom dead center (BDC) of the intake stroke. On the start of the engine 22, the intake valve 128 is opened and closed respectively at a start-time valve open position VVT3 and at a start-time valve close position VVT4, which represent maximum allowable delayed positions by the variable valve timing mechanism 150. When the temperature of the engine 22 at the start time exceeds a low-temperature reference value Tref (explained later), the open and close timings of the intake valve 128 are set to these maximum allowable delayed positions. When the temperature of the engine 22 at the start time is not higher than the low-temperature reference value Tref, on the other hand, the open and close timings of the intake valve 128 are varied by an advanced amount ΔVVT from the respective maximum allowable delayed positions (that is, the start-time valve open position VVT3 and the start-time valve close position VVT4 in FIG. 4). As shown in FIG. 1, the VVT motor 133 is designed to receive a supply of electric power by either of a first route R1 and a second route R2. The first route R1 supplies the electric power from the low voltage battery 53, while the second route R2 supplies the electric power without passing through the low voltage battery 53 but directly from a DC-DC converter 55. On and off operations of two switches SR2 provided on the second route R2 select the electric power supply to the VVT motor 133 between the route R1 and the route R2.

The engine 22 is under control of an engine electronic control unit (hereafter referred to as engine ECU) 24 that functions as internal combustion engine control means.

The engine ECU 24 is constructed as a microprocessor including a CPU 24a, a ROM 24b that stores processing programs, a RAM 24c that temporarily stores data, input and output ports (not shown) and a communication port (not shown). The engine ECU 24 receives, via its input port, signals from various sensors that measure and detect the operating conditions of the engine 22. The signals input into the engine ECU 24 include a crank position from a crank position sensor 140 detected as the rotational position of the crankshaft 26, an engine water temperature Tw from a water temperature sensor 142 measured as the temperature of cooling water in the engine 22, cam positions from a cam position sensor 144 detected as the rotational positions of camshafts driven to open and close the intake valve 128 and the exhaust valve 129 for gas intake and exhaust into and from the combustion chamber 134, a throttle position from a throttle valve position sensor 146 detected as the position of the throttle valve 124, and an amount of intake air into the engine 22 from a vacuum sensor 148. The engine ECU 24 outputs, via its output port, diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to the VVT motor 133. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements.

The motors MG1 and MG2 are constructed as known synchronous motor generators that may be actuated both as a generator and as a motor. The motors MG1 and MG2 transmit electric powers to and from a battery 51 via inverters 41 and 42. The operations of both the motors MG1 and MG2 are controlled by a motor electronic control unit (hereafter referred to as motor ECU) 40. The motor ECU 40 inputs signals required for controlling the operations of the motors MG1 and MG2, for example, signals representing rotational positions of rotors in the motors MG1 and MG2 from rotational position detection sensors (not shown) and signals representing phase currents to be applied to the motors MG1 and MG2 from current sensors (not shown). The motor ECU 40 outputs switching control signals to the inverters 41 and 42. The motor ECU 40 establishes communication with the hybrid electronic control unit 70 to control the operations of the motors MG1 and MG2 in response to control signals input from the hybrid electronic control unit 70 and to output data regarding the operating conditions of the motors MG1 and MG2 to the hybrid electronic control unit 70 according to the requirements.

The high voltage battery 51 is a nickel-metal hydride battery in this embodiment and transmits electrical energy from and to the motors MG1 and MG2 via the inverters 41 and 42. The high voltage battery 51 is connected with the DC-DC converter 55 that converts a high voltage into a low voltage. The high voltage battery 51 supplies electrical energy to the low voltage battery 53 via the DC-DC converter 55 according to the requirements. The DC-DC converter 55 is operated and controlled to lower the direct current voltage supplied from the high voltage battery 51 and accumulate the lowered direct current voltage into the low voltage battery 53. In this manner, electric power is charged from the high voltage battery 51 into the low voltage battery 53.

The low voltage battery 53 is a lead acid battery in this embodiment and works to supply electric power to and activate the VVT motor 133. The low voltage battery 53 also works to supply electrical energy to and activate auxiliary machinery 58 mounted on the hybrid vehicle 20 and supply electric power to and activate the hybrid ECU 70 in response to an ON signal from an ignition switch 80.

The high voltage battery 51 and the low voltage battery 53 are under control and management of a battery electronic control unit (hereafter referred to as battery ECU) 50. The battery ECU 50 inputs signals required for management and control of the high voltage battery 51, for example, an inter-terminal voltage from a voltage sensor 52 located between terminals of the high voltage battery 51, a charge-discharge current from a current sensor (not shown) attached to a power line 57 connecting with an output terminal of the high voltage battery 51, and a battery temperature Tb from a temperature sensor 56 attached to the high voltage battery 51. The battery ECU 50 computes a remaining charge level or current state of charge (SOC) of the high voltage battery 51 for the purpose of management and control of the high voltage battery 51, and calculates a charge-discharge power demand Pb* required to charge the high voltage battery 51 or to be discharged from the high voltage battery 51, based on the computed state of charge (SOC), the battery temperature Tb, and input and output limits Win and Wout of the high voltage battery 51. The battery ECU 50 outputs these computation results and other data to the hybrid electronic control unit 70 by communication, according to the requirements. The battery ECU 50 also inputs signals required for management and control of the low voltage battery 53, for example, an inter-terminal voltage Vb from a voltage sensor 54 located between terminals of the low voltage battery 53 and a charge-discharge current from a current sensor (not shown) attached to a power line connecting with an output terminal of the low voltage battery 53. The battery ECU 50 outputs control signals to the switches SR2.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 87. The hybrid electronic control unit 70 establishes communication with the engine ECU 24, the motor ECU 40, and the battery ECU 50 via its communication port to receive and send the diversity of control signals and data from and to the engine ECU 24, the motor ECU 40, and the battery ECU 50, as mentioned above.

The hybrid vehicle 20 of the embodiment constructed as described above sets a torque demand to be output to the ring gear shaft or the driveshaft, based on the vehicle speed V and the accelerator opening Acc corresponding to the driver's depression amount of the accelerator pedal 83. The engine 22 and the motors MG1 and MG2 are controlled to be driven at efficient drive points, in order to ensure output of a power demand equivalent to the preset torque demand to the ring gear shaft. There are several drive control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by the planetary gear mechanism 30 and the motors MG1 and MG2 and to be output to the ring gear shaft. In a charge-discharge drive mode, the engine 22 is driven and controlled to output a required level of power corresponding to the sum of the power demand and electric power used to charge the high voltage battery 51 or discharged from the high voltage battery 51. The motors MG1 and MG2 are driven and controlled to enable all or part of the output power of the engine 22, which is equivalent to the power demand with charge or discharge of the high voltage battery 51, to be subjected to torque conversion by the planetary gear mechanism 30 and the motors MG1 and MG2 and to be output to the ring gear shaft. In a motor drive mode, the motor MG2 is driven and controlled to ensure output of a required level of power corresponding to the power demand to the ring gear shaft, while the engine 22 stops its operation.

Figure 5:
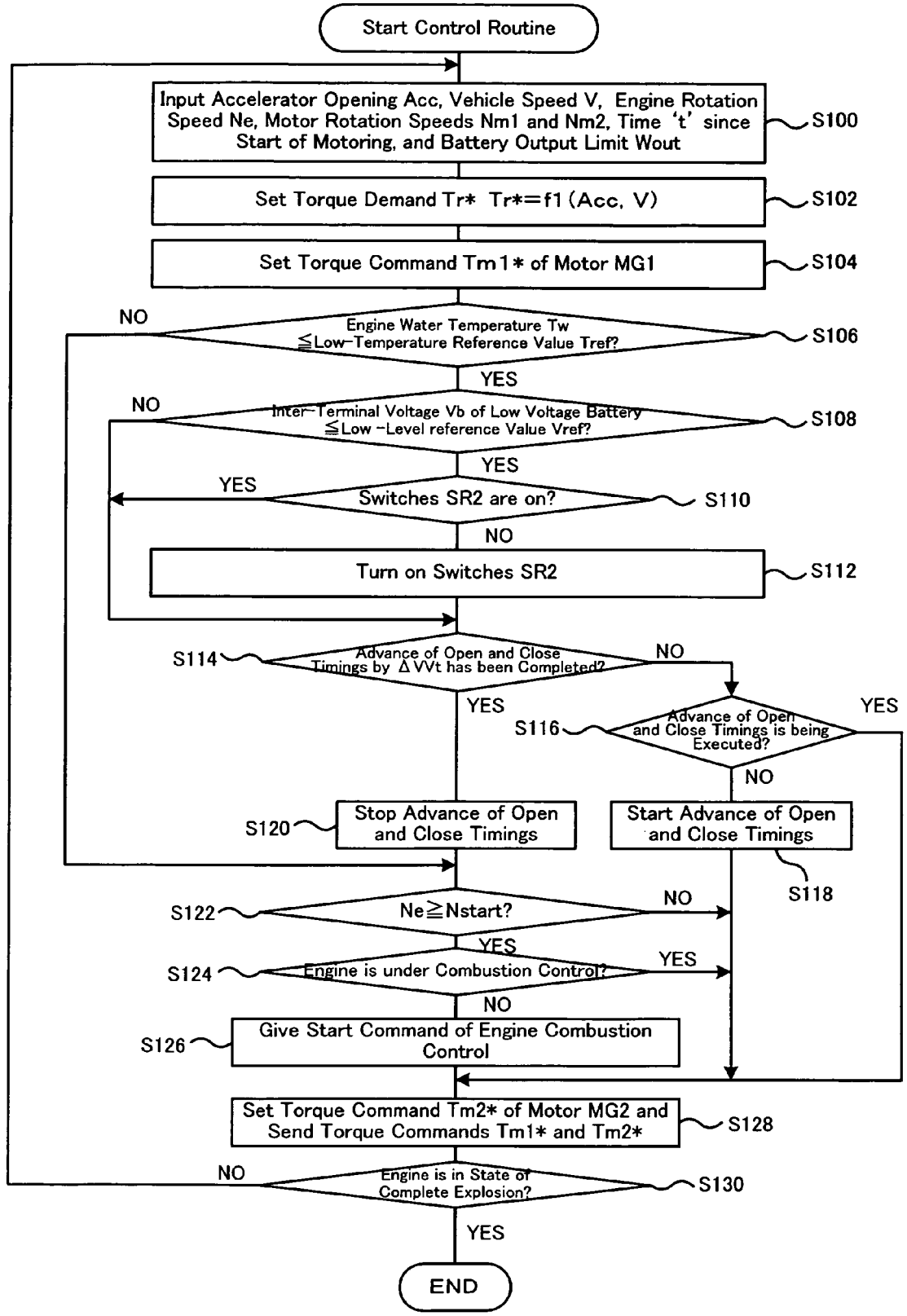
FIG. 5 is a flowchart showing a start control routine.

The description regards the operations of the hybrid vehicle 20 of the embodiment having the configuration discussed above, especially a series of control to restart the engine 22 in an operation stop state, for example, in the case of a shift of the drive mode from the motor drive mode to the torque conversion drive mode or the charge-discharge drive mode. FIG. 5 is a flowchart showing a start control routine executed by the hybrid electronic control unit 70 at a start time of the engine 22. It is here assumed that a valve open position VVTo and a valve close position VVTc of the intake valve 128 are set by the VVT motor 133 immediately after a stop of the operation of the engine 22, such that the intake valve 128 is opened at the start-time valve open position VVT3 and is closed at the start-time valve close position VVT4. Namely the open and close timings of the intake valve 128 are set to the most delayed positions (see FIG. 4).

In the start control routine, the CPU 72 of the hybrid electronic control unit 70 first inputs various data required for control, that is, the accelerator opening Acc from the accelerator pedal position sensor 84, the vehicle speed V from the vehicle speed sensor 87, a rotation speed Ne of the engine 22, rotation speeds Nm1 and Nm2 of the motors MG1 and MG2, a time 't' elapsed since a start of motoring the engine 22, and the output limit Wout of the high voltage battery 51 (step S100). The rotation speed Ne of the engine 22 is computed from the output signal of the crank position sensor 140 attached to the crankshaft 26 and is input from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are input from the motor ECU 40 by communication. The time 't' elapsed since the start of engine motoring represents the count of a timer activated in response to a start command of the engine 22. The output limit Wout of the high voltage battery 51 is set based on the battery temperature Tb of the high voltage battery 51 measured by the temperature sensor 56 and the state of charge SOC of the high voltage battery 51 and is input from the battery ECU 50 by communication.

Figure 6:
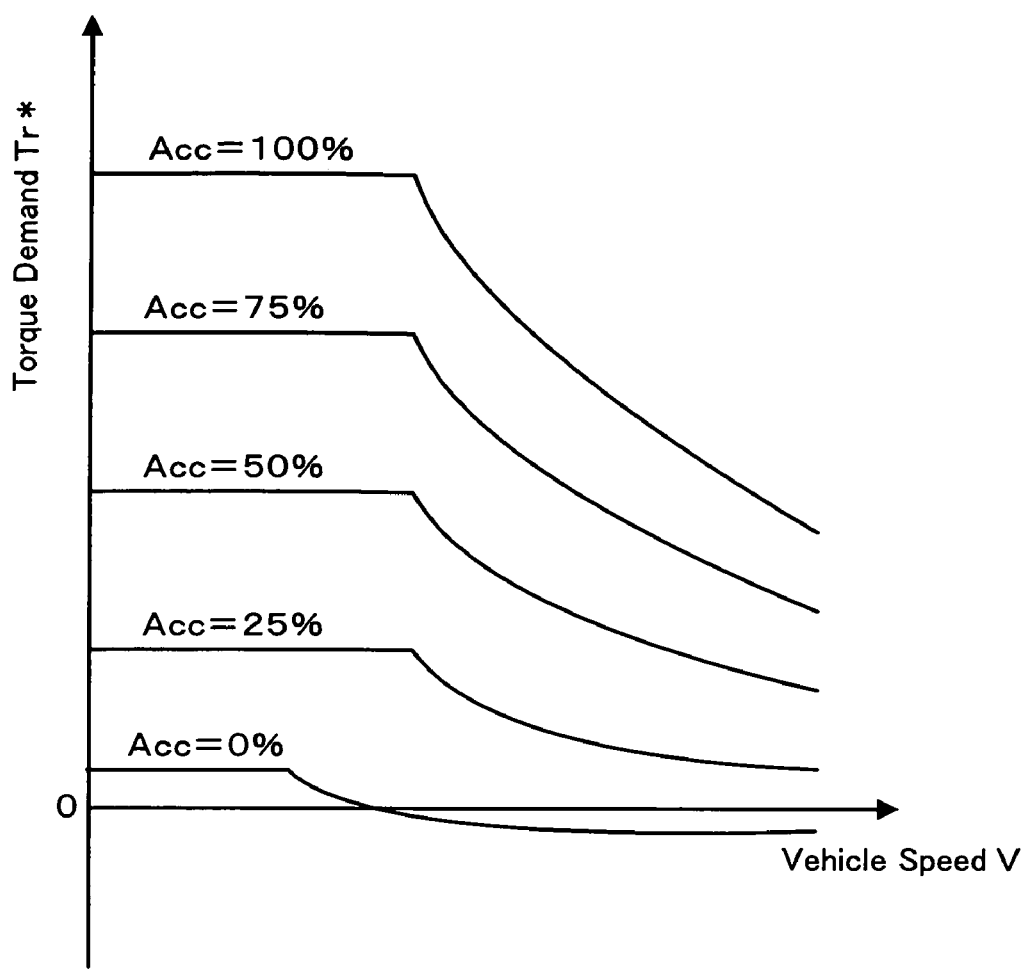
FIG. 6 shows one example of a torque demand setting map.

After the data input, the CPU 72 sets a torque demand Tr* as a torque required for the hybrid vehicle 20, based on the input accelerator opening Acc and the input vehicle speed V (step S102). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from this torque demand setting map. One example of the torque demand setting map is shown in FIG. 6.

Figure 7:
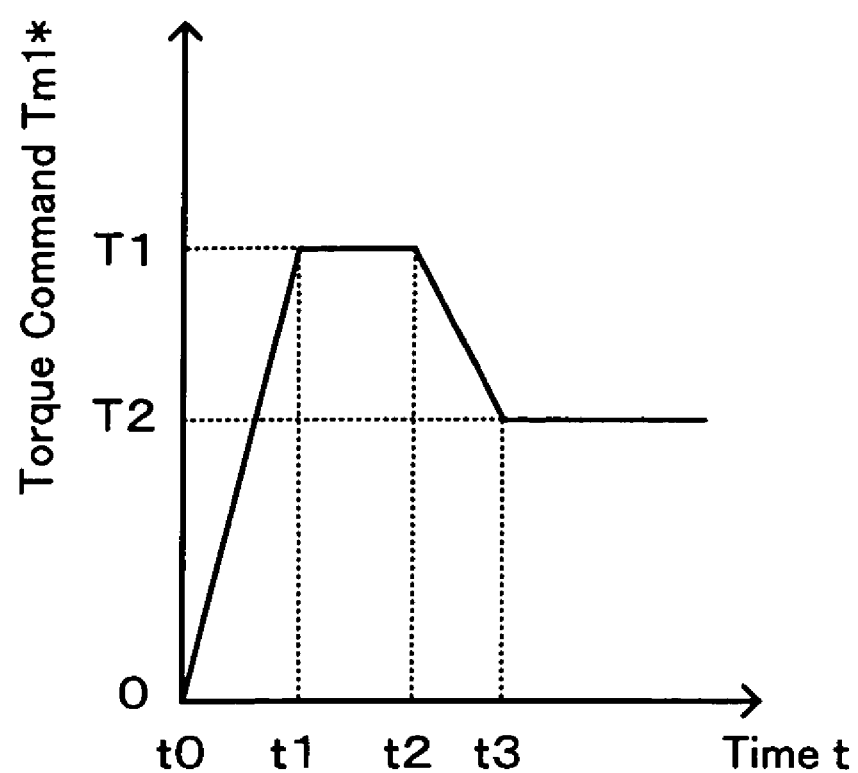
FIG. 7 is a graph showing a variation in torque command Tm1* against time 't' on an engine start time.

A torque command Tm1* of the motor MG1 is then set based on the time 't' elapsed since the start of engine motoring (step S104). A concrete procedure of setting the torque command Tm1* of the motor MG1 in this embodiment stores in advance a variation in torque command Tm1* against the time 't' elapsed since the start of engine motoring as a torque command setting map in the ROM 74 and reads the torque command Tm1* corresponding to the given time 't' from this torque command setting map. One example of the torque command setting map is shown in FIG. 7. The torque command Tm1* of the motor MG1 gradually increases from a time point t0, when the start command of the engine 22 is given, to reach a relatively large specific torque T1 at a time point t1 and is kept at the specific torque T1 for a certain time period between the time point t1 and a time point t2. The torque command Tm1* then gradually decreases from the time point t2 to reach and keep a reference torque T2 at and after a time point t3. The specific torque T1 and the certain time period (between the time points t1 and t2) are set as a torque and a time period enabling a quick increase of the rotation speed Ne of the engine 22 and depend upon the performances of the engine 22 and the high voltage battery 51. The reference torque T2 is set as a torque enabling a further increase of the rotation speed Ne of the engine 22 with saving the electric power consumed for motoring and depends upon the performances of the engine 22 and the high voltage battery 51. The torque command Tm1* of the motor MG1 is set to a torque level enabling the rotation speed Ne of the engine 22 to reach and keep a predetermined start rotation speed Nstart.

After setting the torque command Tm1* of the motor MG1, the CPU 72 determines whether the engine water temperature Tw is not higher than a low-temperature reference value Tref (step S106). The engine water temperature Tw is measured by the water temperature sensor 142 as the temperature of cooling water in the engine 22 and is input from the engine ECU 24 by communication. The low-temperature reference value Tref represents an upper limit in a very low temperature range where the low engine temperature increases the viscosity of oil used in the engine 22 and accordingly causes an extremely little increase in rotation speed Ne of the engine 22. The low-temperature reference value Tref may be specified by repetition of experiments. The upper limit of the very low temperature is, for example, −30° C. when the very low temperature range is not higher than −30° C. When the engine water temperature Tw is higher than the low-temperature reference value Tref, a negative answer is given at step S106. The CPU 72 then determines whether the rotation speed Ne of the engine 22 is not lower than the predetermined start rotation speed Nstart (step S122). Immediately after a start of the engine 22, the rotation speed Ne of the engine 22 is lower than the predetermined start rotation speed Nstart. A negative answer is accordingly given at step S122. The CPU 72 sets a torque command Tm2* of the motor MG2 and sends the settings of the torque commands Tm1* and Tm2* to the motor ECU 40 (step S128). The motor ECU 40 receives the torque commands Tm1* and Tm2* and performs switching control of switching elements included in the inverters 41 and 42 to operate the motor MG1 with the torque command Tm1* and the motor MG2 with the torque command Tm2*.

A concrete procedure of setting the torque command Tm2* of the motor MG2 in this embodiment first calculates an upper torque restriction Tmax as a maximum torque that may be output from the motor MG2 according to Equation (1) given below. The upper torque restriction Tmax is given by dividing a difference between the output limit Wout of the high voltage battery 51 and power consumption of the motor MG1 (the product of the torque command Tm1* and the rotation speed Nm1 of the motor MG1) by the rotation speed Nm2 of the motor MG2. The procedure subsequently calculates a tentative motor torque Tm2tmp to be output from the motor MG2 from the torque demand Tr*, the torque command Tm1* of the motor MG1, a gear ratio ρ of the planetary gear mechanism 30, and a gear ratio Gr of the reduction gear 35 according to Equation (2) given below. The procedure then sets the smaller between the calculated upper torque restriction Tmax and the calculated tentative motor torque Tm2tmp to the torque command Tm2* of the motor MG2. Setting the torque command Tm2* of the motor MG2 in this manner causes the output torque of the motor MG2 to cancel out a reactive torque applied to the ring gear shaft 32a or the driveshaft in the course of motoring the engine 22 with the motor MG1, while enabling output of the torque demand Tr* to the ring gear shaft 32a within the range of output limit Wout of the high voltage battery 51.

$$Tmax=(Wout-Tm1*Nm1)/Nm2 \quad (1)$$

$$Tm2tmp=(Tr*+Tm1*/\rho)/Gr \quad (2)$$

Figure 8:
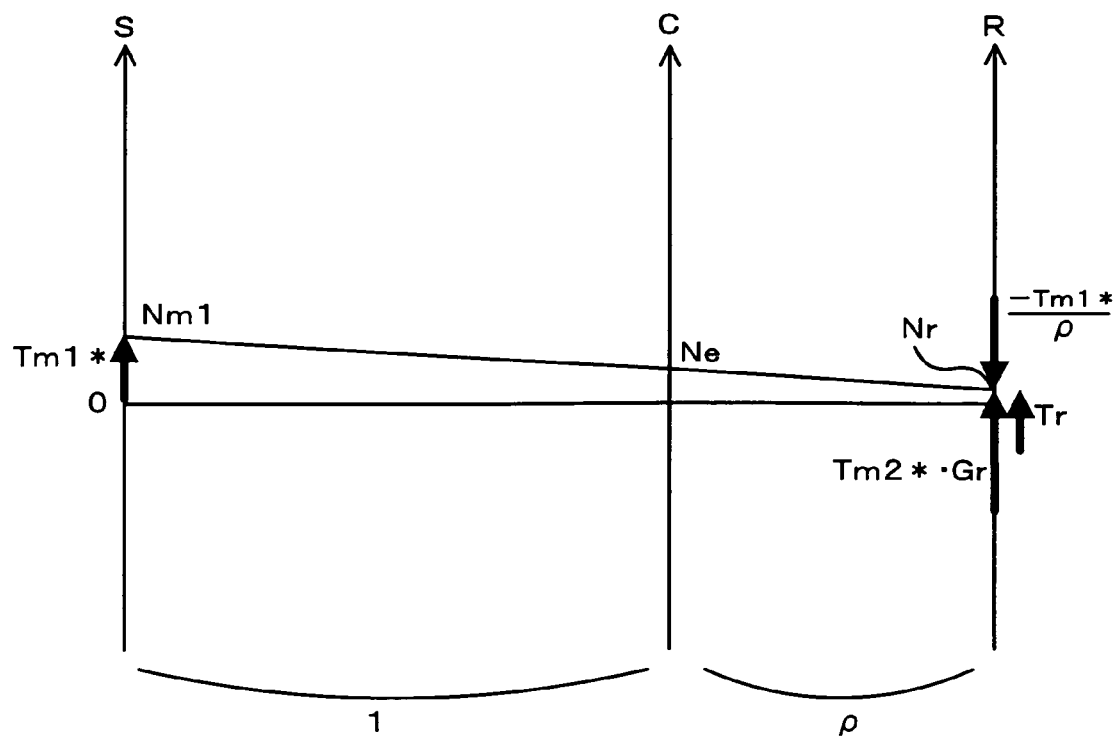
FIG. 8 is an alignment chart showing torque-rotation speed dynamics of rotational elements included in a planetary gear mechanism 30 on the engine start time.

Equation (2) is readily introduced from the alignment chart of FIG. 8. The left axis 'S' represents the rotation speed of the sun gear that is equivalent to the rotation speed Nm1 of the motor MG1. The middle axis 'C' represents the rotation speed of the carrier that is equivalent to the rotation speed Ne of the engine 22. The right axis 'R' represents a rotation speed Nr of a ring gear obtained by multiplying the rotation speed Nm2 of the motor MG2 by the gear ratio Gr of the reduction gear 35. The arrows on the axes 'S', 'C', and 'R' denote torques applied to the respective axes. Since the engine 22 is cranked, no torque of the engine 22 is applied to the carrier. The crankshaft 26 of the engine 22 is thus supported by the torque of the motor MG1 (torque command Tm1*) applied to the sun gear. In this state, the ring gear shaft receives the reactive torque, and the motor MG2 outputs a cancellation torque (=−Tm1*/ρ) to cancel out the reactive torque.

The CPU 72 subsequently identifies whether the engine 22 is in the state of complete explosion (step S130). A concrete procedure of identifying the complete explosion of the engine 22 in this embodiment determines whether the rotation speed Ne of the engine 22 exceeds a preset reference speed Nref, which is higher than the predetermined start rotation speed Nstart by a certain value. In the current state when the rotation speed Ne of the engine 22 has not yet reached the predetermined start rotation speed Nstart, combustion control of the engine 22 including fuel injection control and ignition control has not yet been started. The engine 22 is accordingly not in the state of complete explosion and the processing flow goes back to step S100 in response to a negative answer at step S130.

In the course of the repeated processing of steps S100 to S106 and step S122, the rotation speed Ne of the engine 22 reaches or exceeds the predetermined start rotation speed Nstart. In response to an affirmative answer at step S122, the CPU 72 determines whether the engine 22 is under the combustion control including the fuel injection control and the ignition control (step S124). At the timing when the rotation speed Ne of the engine 22 reaches or exceeds the predetermined start rotation speed Nstart for the first time, the combustion control of the engine 22 has not yet been performed. The CPU 72 then gives a start command for starting the combustion control to the engine ECU 24 (step S126) and executes the processing of steps S128 and S130. The engine ECU 24 receives the start command and starts the combustion control of the engine 22. The open and close timings of the intake valve 128 are set to the most delayed positions, so that there is a low pressure in a cylinder in the compression stroke (in-cylinder compression pressure). At the time of motoring the engine 22, such control restricts an increase in in-cylinder compression pressure to accelerate an increase in rotation speed Ne of the engine 22 and decrease the combustion energy generated in the combustion control, thus reducing a potential shock on the engine start. In a next cycle of this start control routine, the combustion control of the engine 22 has already been started. This gives an affirmative answer at step S124 after the processing of steps S100 to S106 and step S122 and leads to the processing of steps S128 and S130.

The engine 22 falls in the state of complete explosion as a result of the combustion control of the engine 22 during motoring of the engine 22 with the torque command Tm1* of the motor MG1. The CPU 72 accordingly has an affirmative answer at step S130 and terminates the start control routine.

When the engine water temperature Tw is not higher than the low-temperature reference value Tref, on the other hand, an affirmative answer is given at step S106. The CPU 72 then determines whether the inter-terminal voltage Vb of the low voltage battery 53 is not higher than a low-level reference value Vref (step S108). The low-level reference value Vref represents an upper limit in a certain voltage range where a sufficient amount of electric power required for driving the VVT motor 133 is not suppliable from the low voltage battery 53 to the VVT motor 133. The low-level reference value Vref may be specified by repetition of experiments. When the inter-terminal voltage Vb of the low voltage battery 53 is higher than the low-level reference value Vref, it is expected that the sufficient amount of electric power required for driving the VVT motor 133 is suppliable from the low voltage battery 53 to the VVT motor 133. The CPU 72 accordingly does not turn on the switches SR2 but determines whether advance of the open and close timings of the intake valve 128 by a preset advance amount ΔVVT has already been completed (step S114). A negative answer is given at step S114 when the advance of the open and close timings of the intake valve 128 by the preset advance amount ΔVVT has not yet been started. It is then determined whether the advance of the open and close timings of the intake valve 128 is being performed (step S116). A negative answer is given at step S116 since the advance of the open and close timings of the intake valve 128 has not yet been started. The CPU 72 accordingly gives a start command for starting the advance of the open and close timings of the intake valve 128 to the engine ECU 24 (step S118) and executes the processing of steps S128 and S130. The engine ECU 24 receives the start command and starts the advance of the open and close timings of the intake valve 128. In this state, since the switches SR2 are kept off, the electric power is supplied from the low voltage battery 53 to the VVT motor 133 via the first route R1. Since the combustion control of the engine 22 has not yet been started, the engine 22 is not in the state of complete explosion. The processing flow accordingly goes back to step S100 in response to a negative answer at step S130. In a next cycle of this start control routine, the advance of the open and close timings of the intake valve 128 has already been started. This gives an affirmative answer at step S116 after the processing of steps S100 to S108 and step S114 and leads to the processing of and after step S128.

In the course of the repeated processing of steps S100 to S108, S114 to S118, and S128 to S130, the open and close timings of the intake valve have been advanced from the most delayed positions by the preset advance amount ΔVVT. In response to an affirmative answer at step S114, the CPU 72 stops the advance of the intake valve 128 by means of the VVT motor 133 (step S120) and executes the processing of and after step S122. This series of processing advances the open and close timings of the intake valve 128 from the most delayed positions by the preset advance amount ΔVVT when the engine water temperature Tw is not higher than the low-temperature reference value Tref. Under the condition of a large friction arising on the start of the engine 22, for example, due to the low cooling water temperature Tw of the engine 22 and the high viscosity of the oil in the engine 22, the combustion control is performed with the advance of the open and close timings of the intake valve 128. This increases the amount of intake air into the cylinder of the engine 22 and thereby increases the combustion energy in the combustion control. The advance amount ΔVVT is set in advance to ensure introduction of a required amount of intake air corresponding to the combustion energy into the cylinder of the engine 22.

When the inter-terminal voltage Vb of the low voltage battery 53 is not higher than the low-level reference value Vref at step S108, on the other hand, it is subsequently determined whether the switches SR2 are on (step S110). When the switches SR2 are off, the CPU 72 gives a command for turning on the switches SR2 to the battery ECU 50 (step S112). When the switches SR2 are on, the CPU 72 executes the processing of and after step S114. When the inter-terminal voltage Vb of the low voltage battery 53 is not higher than the low-level reference value Vref, the sufficient amount of electric power required for driving the VVT motor 133 is not suppliable from the low voltage battery 53. The switches SR2 are accordingly turned on to supply the electric power to the VVT motor 133 without passing through the low voltage battery 53 but directly from a DC-DC converter 55 via the second route R2. This series of processing enables the advance of the open and close timings of the intake valve 128 with the electric power supplied from the DC-DC converter 55, even when the state of charge of the low voltage battery 53 is very low and insufficient for driving the VVT motor 133. This gives the sufficient combustion energy and ensures the favorable startability of the engine 22 even when the engine water temperature Tw is not higher than the low-temperature reference value Tref.

In the hybrid vehicle 20 of the embodiment described above, on the start of the engine 22, when the engine water temperature Tw is not higher than the low-temperature reference value Tref and there is a need of advancing the open and close timings of the intake valve 128 from the most delayed positions, the electric power is supplied to the VVT motor 133 either via the first route R1 or via the second route R2. Even when the state of charge of the low voltage battery 53 is very low and insufficient, the required electric power is supplied from the DC-DC converter 55 to the VVT motor 133 without passing through the low voltage battery 53. On the start of the engine 22, such start control of the embodiment ensures an adequate change of the open and close timings of the intake valve 128 set in the stop state of the engine 22.

The embodiment discussed above is to be considered in all aspects as illustrative and not restrictive. There may be many modifications, changes, and alterations without departing from the scope or spirit of the main characteristics of the present invention.

Figure 9:
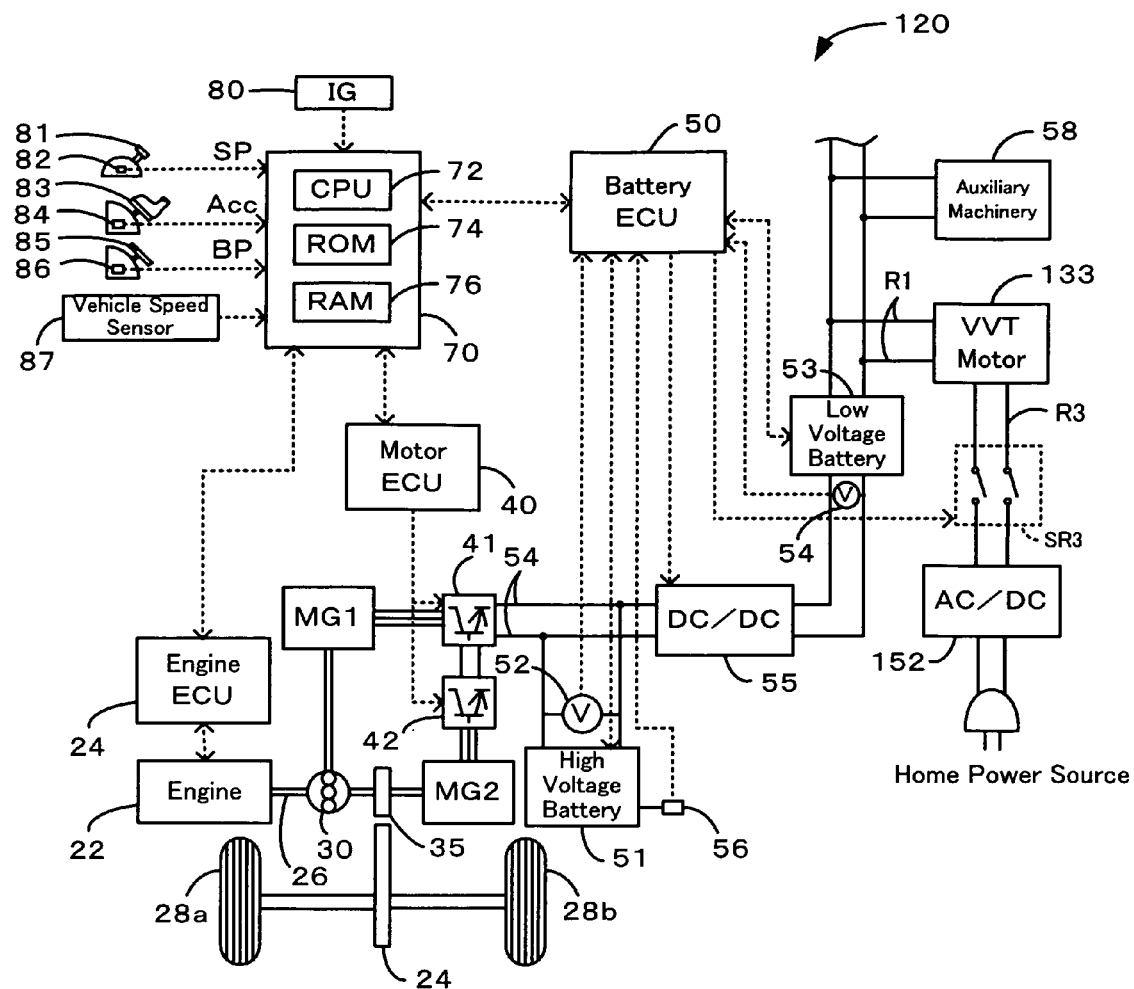
FIG. 9 schematically illustrates the configuration of another hybrid vehicle 120 in one modified example.

In the hybrid vehicle 20 of the embodiment described above, there is the second route R2 to supply the electric power to the VVT motor 133. The second route R2 is, however, not restrictive. A hybrid vehicle 120 of a modified structure shown in FIG. 9 has a third route R3 to supply the electric power from a home power source via an AC-DC converter 152 to the VVT motor 133, instead of the second route R2. In a corresponding modified flow of the start control routine of FIG. 5, when the inter-terminal voltage Vb of the low voltage battery 53 is not higher than the low-level reference value Vref at step S108, switches SR3 provided on the third routine R3 are turned on at steps S110 and S112, instead of the switches SR2. A further modification may provide the third route R3 in addition to the second route R2.

In the hybrid vehicle 20 of the embodiment described above, when the state of charge of the low voltage battery 53 is very low and insufficient at step S108, the switches SR2 are turned on. One modification may turn on the switches SR2 when the state of discharge of the low voltage battery 53 is very low and insufficient.

In the hybrid vehicle 20 of the embodiment described above, the switches SR2 are turned on, when the engine water temperature Tw is not higher than the low-temperature reference value Tref at step S106 and when the state of charge of the low voltage battery 53 is very low and insufficient at step S108. One modification may turn on the switches SR2 without the processing of step S108, when the engine water temperature Tw is not higher than the low-temperature reference value Tref at step S106. The low temperature of the engine 22 often causes the poor performance of the low voltage battery 53. This modified control ensures the supply of electric power to the VVT motor 133 via the second route R2 at the low temperature of the engine 22.

In the hybrid vehicle 20 of the embodiment described above, the switches SR2 are provided only on the second route R2. There may also be switches SR1 provided on the first route R1. In this modified structure, the switches SR1 are on and the switches SR2 are off to supply the electric power from the low voltage battery 53 to the VVT motor 133. The switches SR2 are on and the switches SR1 are off, on the other hand, to supply the electric power from the DC-DC converter 55 to the VVT motor 133 without passing through the low voltage battery 53.

Figure 10:
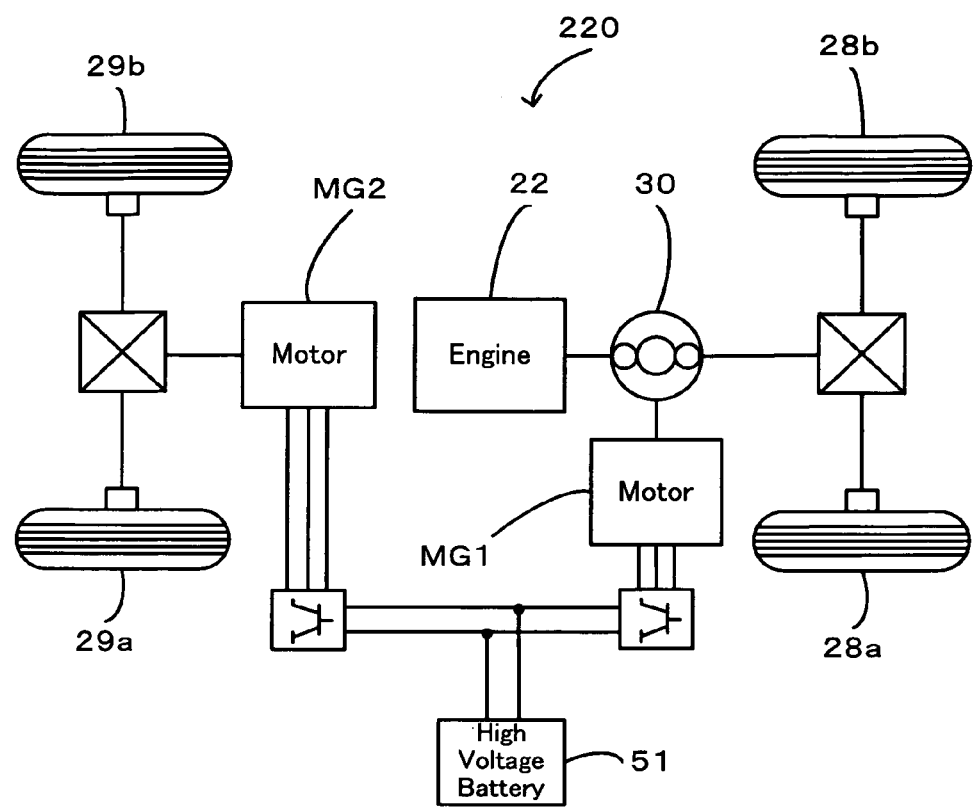
FIG. 10 schematically illustrates the configuration of still another hybrid vehicle 220 in another modified example.

In the hybrid vehicle 20 of the embodiment, the power of the motor MG2 is converted by the reduction gear 35 and is output to the ring gear shaft 32a. The technique of the invention may be applicable to a hybrid vehicle 220 of a modified structure shown in FIG. 10. In the hybrid vehicle 220 of FIG. 10, the power of the motor MG2 is connected to another axle (an axle linked with wheels 29a and 29b) that is different from the axle connecting with the ring gear shaft (the axle linked with drive wheels 28a and 28b).

Figure 11:
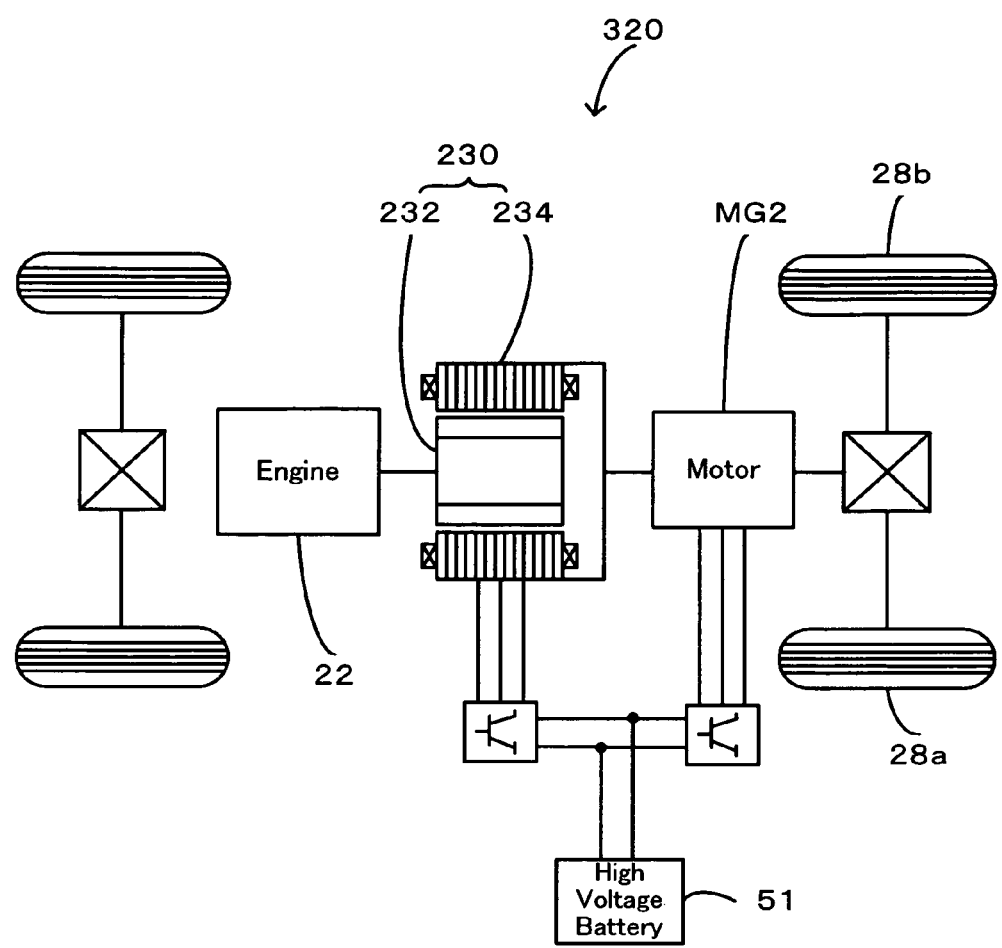
FIG. 11 schematically illustrates the configuration of another hybrid vehicle 320 in still another modified example.

In the hybrid vehicle 20 of the embodiment, the power of the engine 22 is transmitted via the planetary gear mechanism 30 to the ring gear shaft or the driveshaft linked with the drive wheels 28a and 28b. The technique of the invention may also be applicable to a hybrid vehicle 320 of another modified structure shown in FIG. 11. The hybrid vehicle 320 of FIG. 11 is equipped with a pair-rotor motor 230. The pair-rotor motor 230 includes an inner rotor 232 connected to the crankshaft 26 of the engine 22 and an outer rotor 234 connected to a driveshaft for power output to the drive wheels 28a and 28b. The pair-rotor motor 230 transmits part of the output power of the engine 22 to the driveshaft, while converting the residual engine output power into electric power.

The embodiment regards the hybrid vehicle 20. The technique of the invention is, however, not restricted to the hybrid vehicle 20 but is also applicable to conventional automobiles driven by the engine, as well as to diversity of other vehicles, for example, trains and boats and ships.

The present application claims the benefit of priority from Japanese Patent Application No. 2006-145786 filed on May 25, 2006, the entire contents of which are incorporated herein by reference.

INDUSTRIAL APPLICABILITY

The present invention is preferably applicable to diverse industries relating to various power machines equipped with internal combustion engines, for example, motor-related industries including automobiles, buses, and trucks, transport vehicle-related industries including trains, boats and ships, and aircraft, heavy equipment-related industries including construction machinery, and farm machinery-related industries including tractors.

The invention claimed is:

1. A variable valve operating device using a valve-driving motor to vary open and close timings of at least one of an intake valve and an exhaust valve for an internal combustion engine, the variable valve operating device comprising:
   a first route constructed to supply an electric power from a low voltage accumulator to the valve-driving motor, where the low voltage accumulator is capable of storing a low voltage obtained by stepping down a high voltage supplied from a high voltage power source by means of an electric power conversion circuit;
   a second route constructed to supply an electric power as the low voltage obtained by stepping down the high voltage by means of the electric power conversion circuit without passing through the low voltage accumulator; and
   a controller configured to control the valve-driving motor, which receives the supply of electric power via either of the first route or the second route, to vary the open and close timings of the at least one of the intake valve and the exhaust valve on a start of the internal combustion engine, in response to a requirement for varying the open and close timings set at a stop time of the internal combustion engine.

2. The variable valve operating device in accordance with claim 1, the variable valve operating device further having:
   a state detector configured to detect a state of charge or a state of discharge of the low voltage accumulator; and
   a route switchover mechanism configured to activate or deactivate the second route for supplying the electric power to the valve-driving motor,
   wherein when the state of charge or the state of discharge of the low voltage accumulator detected by the state detector satisfies a predetermined low level, the controller controls the route switchover mechanism to activate the second route for supplying the electric power to the valve-driving motor, while controlling the valve-driving motor, which receives the supply of electric power via either of the first route or the second route, to vary the open and close timings.

3. The variable valve operating device in accordance with claim 1, the variable valve operating device further having:
   a temperature detector configured to measure a temperature of the internal combustion engine; and
   a route switchover mechanism configured to activate or deactivate the second route for supplying the electric power to the valve-driving motor;
   wherein when the temperature of the internal combustion engine measured by the temperature detector is within a predetermined low temperature range, the controller controls the route switchover mechanism to activate the second route for supplying the electric power to the valve-driving motor, while controlling the valve-driving motor, which receives the supply of electric power via either of the first route or the second route, to vary the open and close timings.

4. The variable valve operating device in accordance with claim 1, the variable valve operating device further having:
a reference pulley fixed to a camshaft with a cam for opening and closing the intake valve or the exhaust valve to keep a predetermined positional relation to the camshaft and configured to rotate with rotation of the internal combustion engine,
wherein the valve-driving motor changes the positional relation of the reference pulley to the camshaft.

5. A vehicle equipped with the variable valve operating device in accordance with claim 1.

6. A variable valve operating device using a valve-driving motor to vary open and close timings of at least one of an intake valve and an exhaust valve for an internal combustion engine, the variable valve operating device comprising:
a first route constructed to supply an electric power from a low voltage accumulator to the valve-driving motor, where the low voltage accumulator is capable of storing a low voltage obtained by stepping down a high voltage supplied from a high voltage power source by means of an electric power conversion circuit;
a third route constructed to supply an electric power from an external power source, which is different from the high voltage power source, to the valve-driving motor without passing through the low voltage accumulator; and
a controller configured to control the valve-driving motor, which receives the supply of electric power via either of the first route or the third route, to vary the open and close timings of the at least one of the intake valve and the exhaust valve on a start of the internal combustion engine, in response to a requirement for varying the open and close timings set at a stop time of the internal combustion engine.

7. The variable valve operating device in accordance with claim 6, the variable valve operating device further having:
a state detector configured to detect a state of charge or a state of discharge of the low voltage accumulator; and
a route switchover mechanism configured to activate or deactivate the third route for supplying the electric power to the valve-driving motor,
wherein when the state of charge or the state of discharge of the low voltage accumulator detected by the state detector satisfies a predetermined low level, the controller controls the route switchover mechanism to activate the third route for supplying the electric power to the valve-driving motor, while controlling the valve-driving motor, which receives the supply of electric power via either of the first route or the third route, to vary the open and close timings.

8. The variable valve operating device in accordance with claim 6, the variable valve operating device further having:
a temperature detector configured to measure a temperature of the internal combustion engine; and
a route switchover mechanism configured to activate or deactivate the third route for supplying the electric power to the valve-driving motor;
wherein when the temperature of the internal combustion engine measured by the temperature detector is within a predetermined low temperature range, the controller controls the route switchover mechanism to activate the third route for supplying the electric power to the valve-driving motor, while controlling the valve-driving motor, which receives the supply of electric power via either of the first route or the third route, to vary the open and close timings.

9. The variable valve operating device in accordance with claim 6, wherein the external power source is a home power source.

10. The variable valve operating device in accordance with claim 6, the variable valve operating device further having:
a reference pulley fixed to a camshaft with a cam for opening and closing the intake valve or the exhaust valve to keep a predetermined positional relation to the camshaft and configured to rotate with rotation of the internal combustion engine,
wherein the valve-driving motor changes the positional relation of the reference pulley to the camshaft.

11. A vehicle equipped with the variable valve operating device in accordance with claim 6.

12. A control method of a variable valve operating device, which uses a valve-driving motor to vary open and close timings of at least one of an intake valve and an exhaust valve for an internal combustion engine,
the control method controlling the valve-driving motor, which receives a supply of electric power via either of a first route or a second route, to vary the open and close timings of the at least one of the intake valve and the exhaust valve on a start of the internal combustion engine, in response to a requirement for varying the open and close timings set at a stop time of the internal combustion engine, where the first route supplies an electric power to the valve-driving motor from a low voltage accumulator that is capable of storing a low voltage obtained by stepping down a high voltage supplied from a high voltage power source by means of an electric power conversion circuit, and the second route supplies an electric power as the low voltage obtained by stepping down the high voltage by means of the electric power conversion circuit without passing through the low voltage accumulator.

13. A control method of a variable valve operating device, which uses a valve-driving motor to vary open and close timings of at least one of an intake valve and an exhaust valve for an internal combustion engine,
the control method controlling the valve-driving motor, which receives a supply of electric power via either of a first route or a third route, to vary the open and close timings of the at least one of the intake valve and the exhaust valve on a start of the internal combustion engine, in response to a requirement for varying the open and close timings set at a stop time of the internal combustion engine, where the first route supplies an electric power to the valve-driving motor from a low voltage accumulator that is capable of storing a low voltage obtained by stepping down a high voltage supplied from a high voltage power source by means of an electric power conversion circuit, and the third route supplies an electric power from an external power source, which is different from the high voltage power source, to the valve-driving motor without passing through the low voltage accumulator.

* * * * *